(12) United States Patent
O'Connor (10) Patent No.: US 8,904,960 B2
(45) Date of Patent: Dec. 9, 2014

(54) ANIMAL FEEDER

(76) Inventor: Michelle Patricia O'Connor, Athlone (IE)

(*) Notice: Subject to any disclaimer, the term of this patent is extended or adjusted under 35 U.S.C. 154(b) by 0 days.

(21) Appl. No.: 13/695,450

(22) PCT Filed: May 25, 2011

(86) PCT No.: PCT/IE2011/000028
§ 371 (c)(1),
(2), (4) Date: Jan. 4, 2013

(87) PCT Pub. No.: WO2011/148361
PCT Pub. Date: Dec. 1, 2011

(65) Prior Publication Data
US 2013/0174788 A1   Jul. 11, 2013

(30) Foreign Application Priority Data
May 26, 2010   (IE) .................... S2010/0343

(51) Int. Cl.
*A01K 5/00* (2006.01)
*A01K 5/01* (2006.01)
*A01K 5/02* (2006.01)

(52) U.S. Cl.
CPC ........... *A01K 5/0107* (2013.01); *A01K 5/0225* (2013.01); *A01K 5/01* (2013.01)
USPC ..................................... 119/52.1

(58) Field of Classification Search
USPC ............ 119/52.1, 51.12, 51.13, 53, 57, 57.6, 119/57.9, 61.1
See application file for complete search history.

(56) References Cited

U.S. PATENT DOCUMENTS

| | | | |
|---|---|---|---|
| 45,190 A * | 11/1846 | Steller | |
| 130,735 A * | 8/1872 | McElrath & Houghton ... | 119/53 |
| 421,465 A * | 2/1890 | Woodworth ................ | 119/52.4 |
| 893,623 A * | 7/1908 | Groh ............................... | 119/53 |
| 997,248 A * | 7/1911 | Freeman ......................... | 119/53 |
| 1,022,668 A * | 4/1912 | Felker .......................... | 119/52.1 |
| 1,192,677 A * | 7/1916 | Parks .......................... | 119/51.13 |
| 2,636,627 A * | 4/1953 | Stoker .......................... | 414/457 |
| 2,661,800 A * | 12/1953 | Reichenbach ............... | 119/476 |
| 2,842,096 A | 7/1958 | Bradfield | |
| 3,120,835 A * | 2/1964 | Kopps ......................... | 119/52.1 |
| 3,900,008 A * | 8/1975 | Jinnette ..................... | 119/51.13 |
| 4,020,794 A * | 5/1977 | Nethery ........................ | 119/58 |
| 4,040,389 A * | 8/1977 | Walters ....................... | 119/52.1 |
| 4,195,594 A * | 4/1980 | Siciliano et al. ............ | 119/57.6 |
| 4,364,333 A | 12/1982 | Touchette | |

(Continued)

FOREIGN PATENT DOCUMENTS

| GB | 823217 | 11/1959 |
|---|---|---|
| GB | 2 450 508 A | 12/2008 |

OTHER PUBLICATIONS

International Search Report for PCT Application No. PCT/IE2011/000028 mailed Oct. 12, 2011.

*Primary Examiner* — Monica Williams
*Assistant Examiner* — Jessica Wong
(74) *Attorney, Agent, or Firm* — RatnerPrestia (57) ABSTRACT

An animal feeder for grazing/foraging animals adapted to anatomically replicate a natural grazing/foraging position and physiologically replicate a natural grazing/foraging pattern in which the animal feeder has a hopper for storing feed, and a trough from which an animal can feed in a natural ground-level grazing position.

16 Claims, 10 Drawing Sheets

(56) References Cited

U.S. PATENT DOCUMENTS

| | | | |
|---|---|---|---|
| 4,790,266 A * | 12/1988 | Kleinsasser et al. | 119/51.5 |
| 4,949,676 A * | 8/1990 | Burns | 119/52.1 |
| 4,955,321 A * | 9/1990 | Waldner | 119/61.1 |
| 5,572,948 A * | 11/1996 | Womack | 119/53 |
| 5,794,561 A * | 8/1998 | Schulz | 119/52.1 |
| 6,378,460 B1 * | 4/2002 | Skurdalsvold et al. | 119/61.56 |
| 6,481,376 B1 * | 11/2002 | Finklea | 119/57.91 |
| 7,100,791 B2 * | 9/2006 | Berger | 220/831 |
| 2007/0289538 A1 | 12/2007 | Sherriff et al. | |
| 2010/0083905 A1 | 4/2010 | Robbins, III et al. | |
| 2011/0197819 A1 * | 8/2011 | Montgomery | 119/51.11 |

\* cited by examiner

ANIMAL FEEDER

This invention relates to an animal feeder and more particularly to an animal feeder for grazing/foraging animals adapted to anatomically replicate a natural grazing/foraging position and physiologically replicate a natural grazing/foraging pattern.

BACKGROUND OF THE INVENTION

Animals such as horses, cattle, pigs and the like that are kept indoors are generally fed at intervals with forage from wall mounted feeders or feeders raised above ground level including, feeding bowls, hay racks, mangers or hay-nets or from open buckets or other containers placed on the ground containing dry feed. Alternatively, forage is sometimes simply placed directly on the ground for the animal.

However, the above mentioned feeding methods and containers suffer from a number of disadvantages. Although the following drawbacks of known animal feeders are generally described in relation to a horse, it will be appreciated by those skilled in the art that similar or identical disadvantages are likely to be encountered with such feeders when used with other animals such as cattle, sheep, pigs and the like.

Wall mounted feeders such as hay-nets and the like must be positioned at a sufficient height so as not to reach ground level and create a hazard for a horse. In particular, hay-nets must be securely mounted in position and must not reach the ground when empty thereby further increasing the height at which the hay-net must be hung.

Importantly, all wall-mounted or raised feeders require an animal to feed in an unnatural non-grazing position i.e. above ground level—indeed wall mounted feeders can be mounted at heights of up to 1.0 to 2.0 resulting in severe muscular strain on the animal. Horses compelled to feed at a height can suffer from a misalignment or malocclusion of the upper and lower dental arcades leading to abnormal tooth wear patterns resulting in the development of cranial and caudal hooks on the teeth. For example, even in a standing position with the horse holding its head at approximately shoulder height, the teeth in the upper jaw protrude by approximately 2 mm over the teeth of the lower jaw giving rise to a highly unnatural non-grazing bite. Cranial and caudal hooks can lead to pain and considerable discomfort for the horse, nutritional deficiencies, behavioural abnormalities or deterioration in performance.

Feeding at a height places biomechanical stress on the animal at inter alia the head, neck and back and can contribute to musculoskeletal problems or stresses in these areas due to the unnaturally high head position. A horse with an elevated head carriage while feeding is therefore highly susceptible to thoracic, thoracolumbar and lumbar muscular strains due to sustained muscle contraction within these regions while chewing.

Feeding from elevated feeders also places additional stress on the temporomandibular joints, the atlanto-occipital and atlanto-axial joints and the associated musculature due to the twisting and rotating action of the horse's head as forage is pulled from the feeder.

Finally, although simply placing forage on the ground can replicate a natural grazing position, the forage quickly become soiled and inedible leading to wastage and potential underfeeding of the animal.

In general, due to their physiological make-up, grazing animals such as horses, cattle, sheep and like are habitual continuous grazers as opposed to interval feeders i.e. the animals exhibit a natural continuous grazing pattern. For example, horses in particular have a small stomach capacity (9-15 liters for the average horse) and a continuous natural grazing pattern provides a constant low volume trickle of forage through the stomach. Digestive acids are produced in the stomach irrespective of whether the horse is eating so that the absence of food in the stomach can result in the formation of gastric ulcers in the upper area of the stomach.

In general, known feeders only permit intermittent feeding of grazing animals e.g. known feeders are typically replenished at five to six hour intervals. Accordingly, where a stabled horse bolts its feed following replenishment of the feeder, the horse's stomach can be empty for prolonged periods resulting in an increased risk of ulcer formation.

Moreover, horses that bolt their feed, reduce the time spent chewing the feed, thereby compromising digestive efficiency which can also adversely affect digestion further down the gastrointestinal tract. For example, an average stabled horse chews 3,400 times/kg of forage and finishes eating forage in approximately 30-40 minutes for each feed. Accordingly, where the average horse is fed three times daily, no forage enters the horse's stomach for 22 hours in a 24 hour period. In addition, as the horse cannot then continuously graze in accordance with its natural instinct, the horse can become stressed and bored and suffer from physiological problems such as the aforementioned gastric ulcers and behavioural abnormalities such as crib-biting or wind-sucking.

More than 90% of racehorses in training have been reported to suffer from gastric ulcers which are one of the leading causes of impaired performance in the competition horse while non-competition horses such as foals and stabled horses in general are known to suffer from a high incidence ulcers. In contradistinction, a horse grazing in a field ad libitum has a natural mechanism of self-protection against gastric ulcers due to a continuous supply of forage passing into and through the stomach which, combined with the ongoing production of saliva during chewing, buffers the acidity of the digestive acids produced in the stomach.

Reducing the feeding interval with known feeders to reduce the incidence of ulcers is overly labour intensive while various more elaborate feeders known in the art fail to address the anatomical and physiological problems outlined above. For example, British Patent Specification No. 2,450,507 describes a feeder having a movable frame which moves downwards but not to ground level as food is removed or eaten so that the natural grazing position fails to be replicated.

SUMMARY OF THE INVENTION

According to the invention there is provided an animal feeder comprising:
 a hopper for storing feed, and
 a trough from which an animal can feed disposed beneath the hopper and communicable with the hopper to receive feed from the hopper, the trough being adapted to present feed to an animal in a natural ground-level grazing position.

Preferably, the trough is recessed beneath the hopper so that the hopper overhangs the trough and, suitably, the hopper comprises at least one curved wall portion to direct feed from the hopper to the trough.

In a preferred embodiment of the invention, the hopper comprises a bottom wall having a front wall, a rear wall, a first side wall and a second side wall upstanding therefrom and the trough is forwardly disposed on the front wall, the rear wall comprising the curved wall portion to direct feed towards the forwardly disposed trough from the hopper under gravity.

Advantageously, the rear wall and the front wall are forwardly inclined to overhang the trough and direct feed from the hopper towards the curved wall portion.

Suitably, the hopper is communicable with the trough via a feed aperture defined between the hopper and the trough and the hopper further comprises a hopper lid.

Preferably, the animal feeder comprises a wheelset mounted on the feeder for moving the feeder and a handle on the hopper.

In a preferred embodiment of the invention, the trough comprises a recessed feed outlet from which an animal can extract feed from the trough and a feed controlling dispenser at the feed outlet to physiologically replicate a natural continuous grazing pattern.

Preferably, the feed controlling dispenser comprises means for regulating access to the feed in the trough and, more preferably, the feed controlling dispenser comprises a releasable failsafe mechanism adapted to prevent entrapment of a limb in the trough.

Suitably, the means for regulating access to the feed in the trough comprises a series of fingers disposed across the recessed feed outlet and, advantageously, the fingers are arcuately curved in a concave recessed disposition into the trough.

Suitably, each finger comprises a release mechanism for individually releasing the fingers from the series. Preferably, the release mechanism comprises a releasable wedge on each finger that can be released under weight pressure.

In a preferred embodiment of the invention, the fingers are movably mounted in the series to allow upwards and downwards movement of the fingers during feeding.

Preferably, the fingers are slidably mounted in a housing adjacent the recessed feed outlet, the housing being fitted with a retainer to prevent retraction of the fingers from the retainer.

In an alternative embodiment of the invention, the release mechanism further comprises a rod on the feeder from which the fingers are mounted between the rod and the wedges across the recessed feed outlet so that the fingers remain on the rod following release.

In an alternative embodiment of the invention, the means for regulating access to the feed comprises a mesh.

In a particularly preferred embodiment of the invention, the animal feeder is a horse feeder.

The animal feeder of the invention enables an animal to adopt a comfortable and correct anatomical position of its head and neck during feeding to anatomically replicate the natural head and neck position adopted by the animal when grazing. Accordingly, the animal can feed as nature intended. The hopper of the animal feeder is also dimensioned to meet the daily dietary requirements of the animal and the rate at which feed is dispensed by the feeder or made available to the animal is constant and controlled to mimic natural grazing/foraging patterns thereby preventing over-eating or feed bolting. The animal feeder is labour saving as it does not require multiple replenishing over a daily period.

As the animal feeder of the invention enables a horse to eat at ground level, muscle strain in the topline musculature is reduced, particularly in the thoracic, thoracolumbar and lumbar regions of the back. More particularly, as it is only when the horse's head is at ground level to feed that the teeth of the lower jaw move forward to meet exactly with the teeth of the upper jaw, the feeder of the invention enables the horse to feed in an anatomically comfortable position which facilitates normal movement of the jaw so that a more even and regular tooth wear pattern results. Thoracic, thoracolumbar and lumbar muscular strains due to sustained muscle contraction within these regions during high head carriage while feeding at a height are therefore eliminated by the feeder of the invention.

As the animal feeder of the invention facilitates feeding ad libitum as with natural grazing, a horse fed employing the animal feeder of the invention enjoys natural mechanisms of self-protection against gastric ulcers due to the continuous supply of feed available to the horse which can pass into and through the stomach which, combined with the ongoing production of saliva during chewing, buffers the acidity of the digestive acids produced in the stomach i.e. as the horse can feed in a continuous grazing-like fashion at the feeder of the invention, it is not necessary for the horse to endure prolonged periods without food thereby reducing the incidence of ulcers. Accordingly, the animal feeder of the invention facilitates a constant supply of feed to a horse which encourages a constant flow of saliva and maintains a constant supply of feed to the stomach which aids in buffering the acidic medium in the stomach, thereby reducing the incidence of ulcer formation.

The animal feeder of the invention is particularly efficacious at reducing ulcers in horses that have a pre-disposition towards ingesting and chewing feed at a fast rate (which in turn reduces the amount of time spent chewing, the amount of saliva produced and the digestibility of the partially chewed feed) by controlling the availability of feed to the horse with the feed controlling dispenser so that the horse is compelled to feed in a naturally continuous grazing-like manner—i.e. feed is constantly passing through the mouth and stomach to generate buffering saliva and reduce the risk of damage by digestive acids in an empty stomach. More particularly, the animal feeder provides controlled delivery of continuously available feed to animals in such a manner that provides a continuous flow of feed through the stomach to mimic the trickle-feeding pattern of ad-libitum grazing animals, thereby minimising the risk of the occurrence physiological disorders such as ulcers. In so doing, the animal feeder of the invention also reduces the risk of behavioural problems such as stress, boredom and stable vices.

As a horse can eat at ground level with the feeder of the invention, ingress of dust from the feed into the horse's respiratory system and eyes which create or worsen disorders such as Chronic Obstructive Pulmonary Disease (COPD) and eye infections is reduced or eliminated.

More generally, the safety features of the animal feeder of the invention, including curved or smooth edges, the recessed trough and the releasable fingers of the trough ensure that the animal feeder does not present a safety hazard to a horse when left in-situ for prolonged unsupervised periods.

The animal feeder of the invention is stable in use in the stationary position but is also easily manoeuvrable and movable due to the presence of the wheelset.

BRIEF DESCRIPTION OF THE DRAWINGS

The invention will now be described, by way of example only, with reference to the accompanying drawings in which.

DETAILED DESCRIPTION OF THE INVENTION

FIGS. 1 to 5 show an animal feeder 1 in accordance with the invention for grazing/foraging animals adapted, firstly, to anatomically replicate or mimic an animal's natural grazing/foraging position and, secondly, to physiologically replicate an animal's natural grazing/foraging pattern. The animal feeder 1 is suitable for use with a variety of feed/forage types (hereinafter referred to as feed) such as hay, dry feed and the like.

As shown in the drawings, the animal feeder 1 is made up of an upper feed storage bin or hopper 2 and a lower recessed integral feeding trough 3. The hopper 2 is typically dimensioned to store an animal's daily feed requirement and is formed from a bottom wall 4 having a front wall 5, a rear wall 6, a first side wall 7 and a second side wall 8 upstanding therefrom to define a hopper opening 9. The hopper opening 9 is surrounded by an upper lip 10 on the front wall 5, rear wall 6, first side wall 7 and second side wall 8. The recessed feeding trough 3 is located on front wall 5 of the hopper 2 at ground level.

Figure 4:
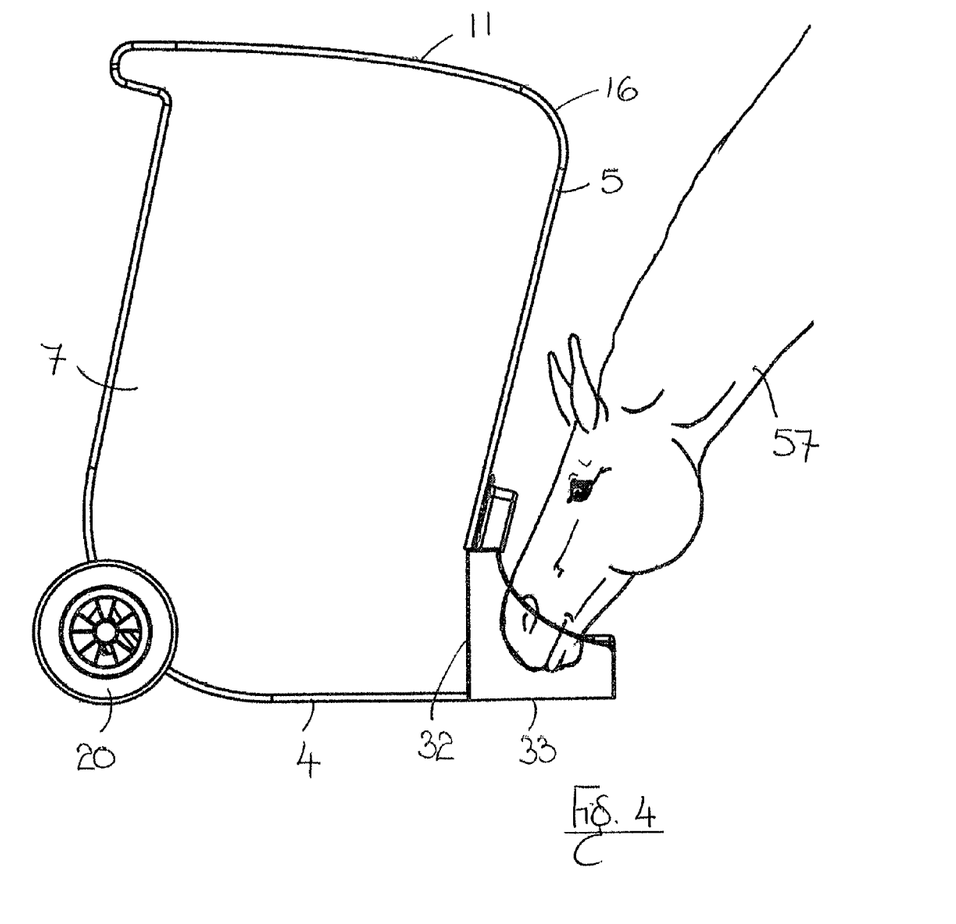
FIG. 4 is a side elevation of the animal feeder with a horse feeding from the trough of the animal feeder in the anatomically correct natural grazing position.
Figure 5:
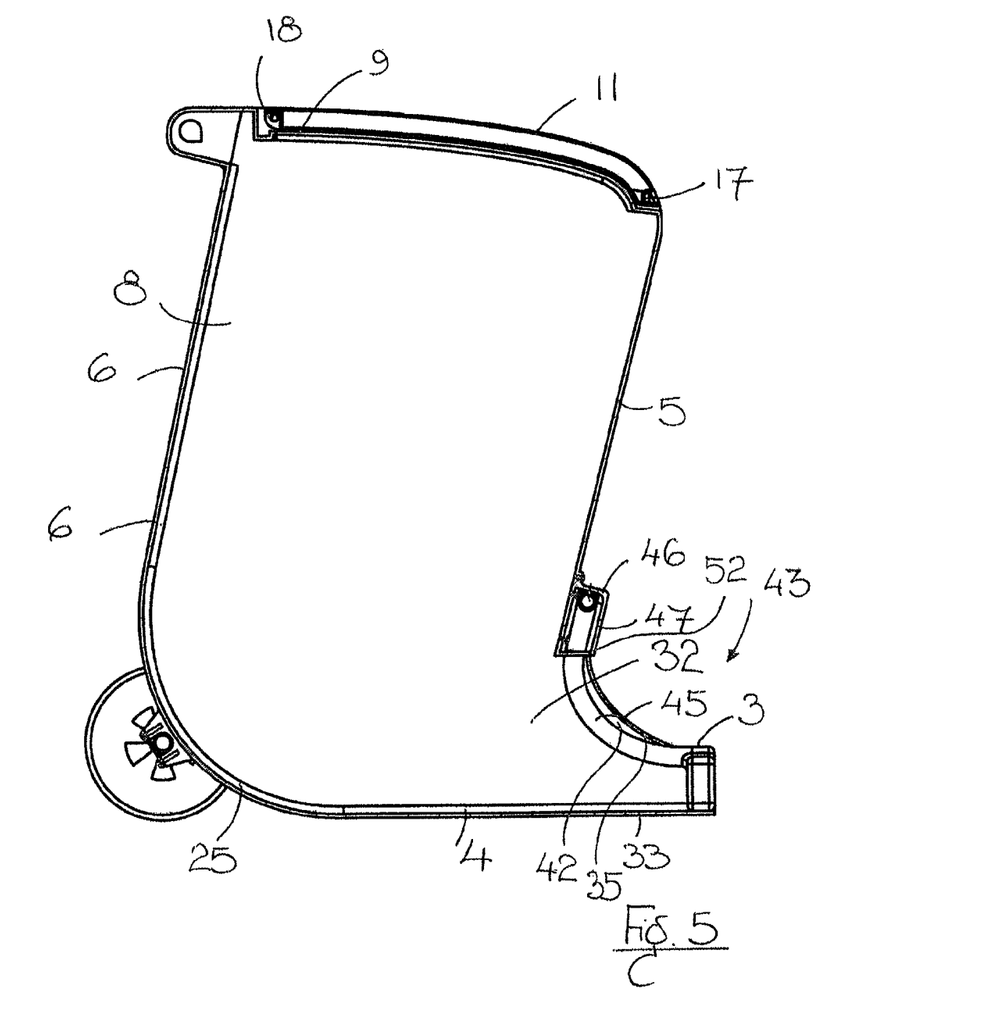
FIG. 5 is longitudinal cross-sectional view through the animal feeder of FIG. 4.

The front wall 5, rear wall 6, first side wall 7 and second side wall 8 are shaped and contoured to substantially resemble a rhomboid-like parallelogram when viewed from the side as shown in FIG. 4 or in cross-section as shown in FIG. 5. More particularly, the front wall 5 and the rear wall 6 extend upwards and forwards in a parallel manner from the bottom wall 4 so that the front wall 5 overhangs the trough 3 and, conversely, the trough 3 is recessed beneath the overhanging front wall 5 to minimise the risk of an animal's foot coming into contact with the trough 3.

Figure 1C:
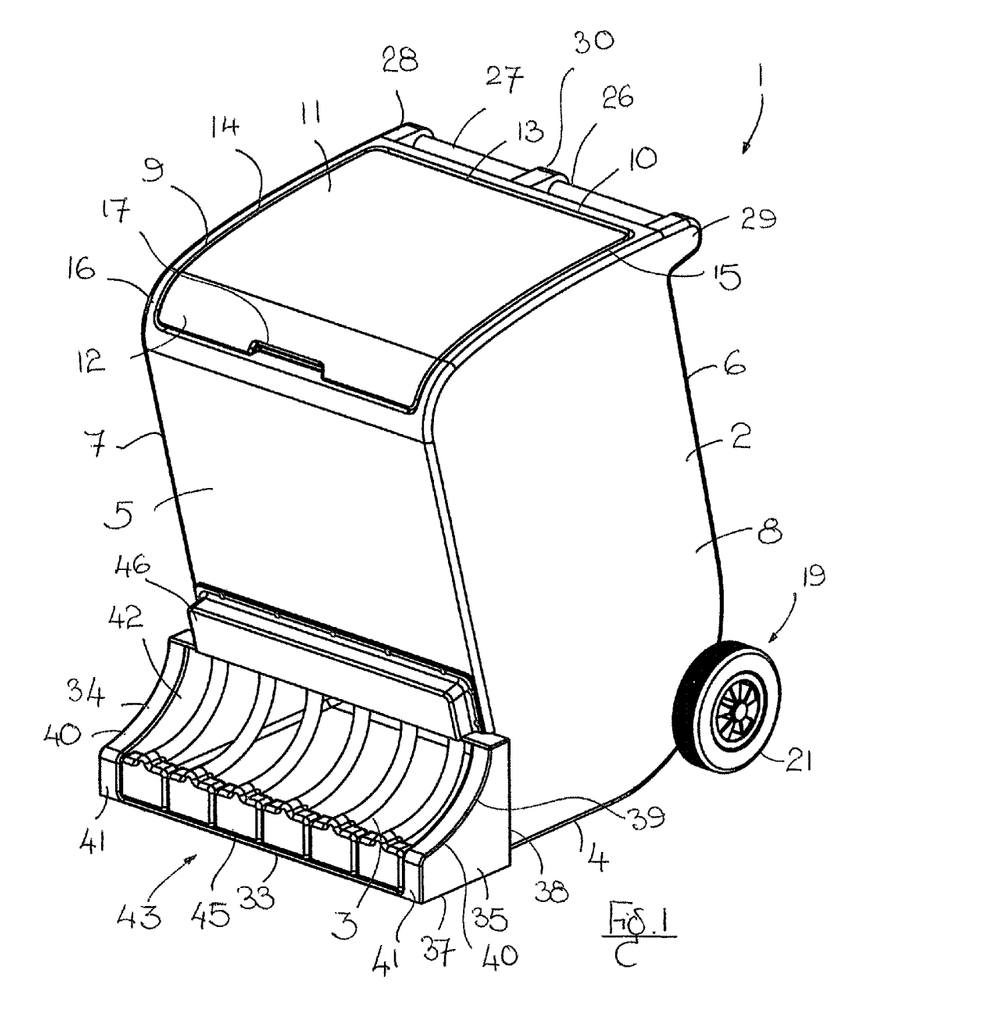
FIG. 1 is a perspective view from above and the front side of a mobile animal feeder of the invention, in the stationary position, adapted to anatomically replicate a natural ground-level grazing/foraging position and physiologically replicate a natural continuous grazing/foraging pattern.
Figure 2:
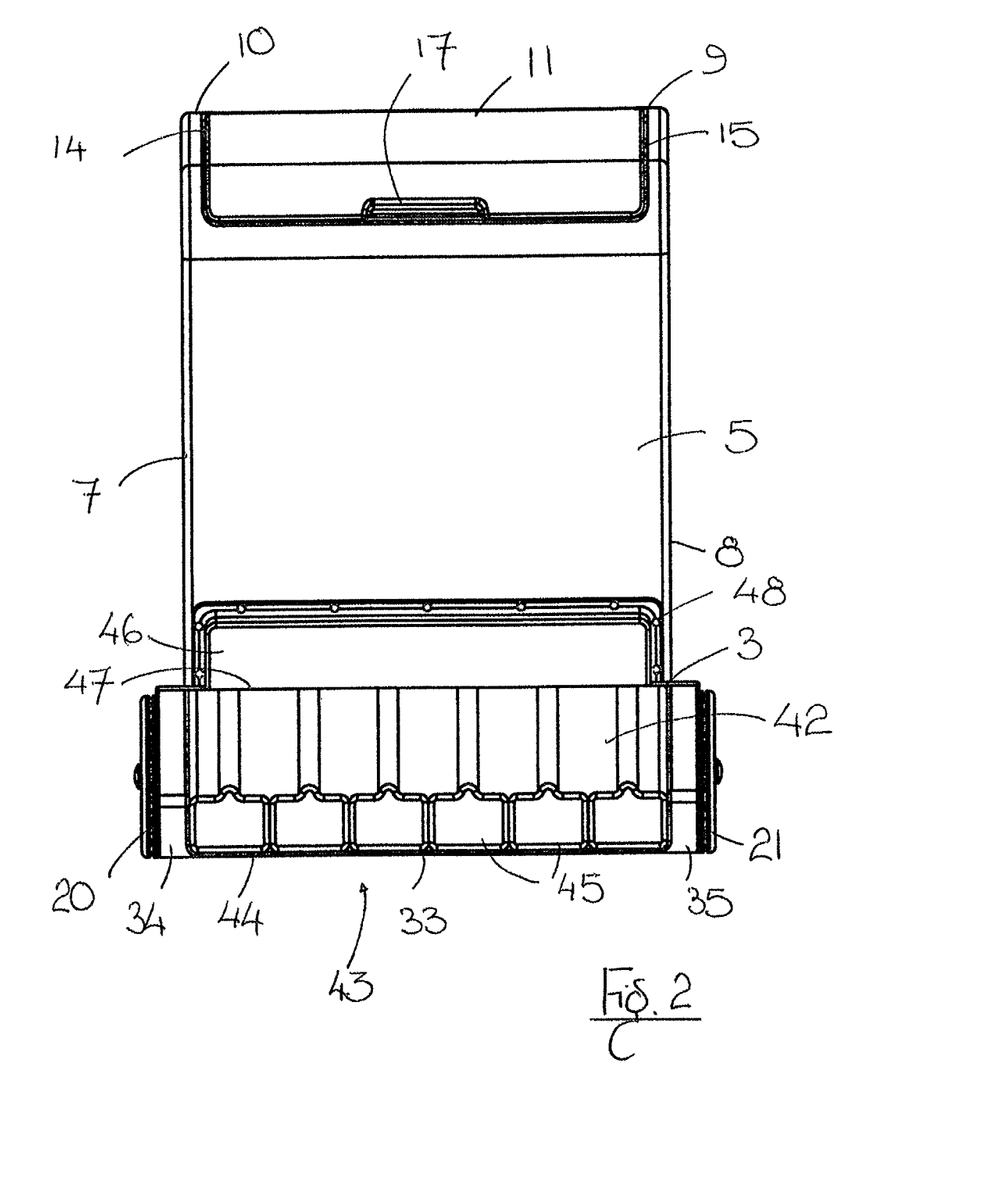
FIG. 2 is a front elevation of the animal feeder of FIG. 1.
Figure 3C:
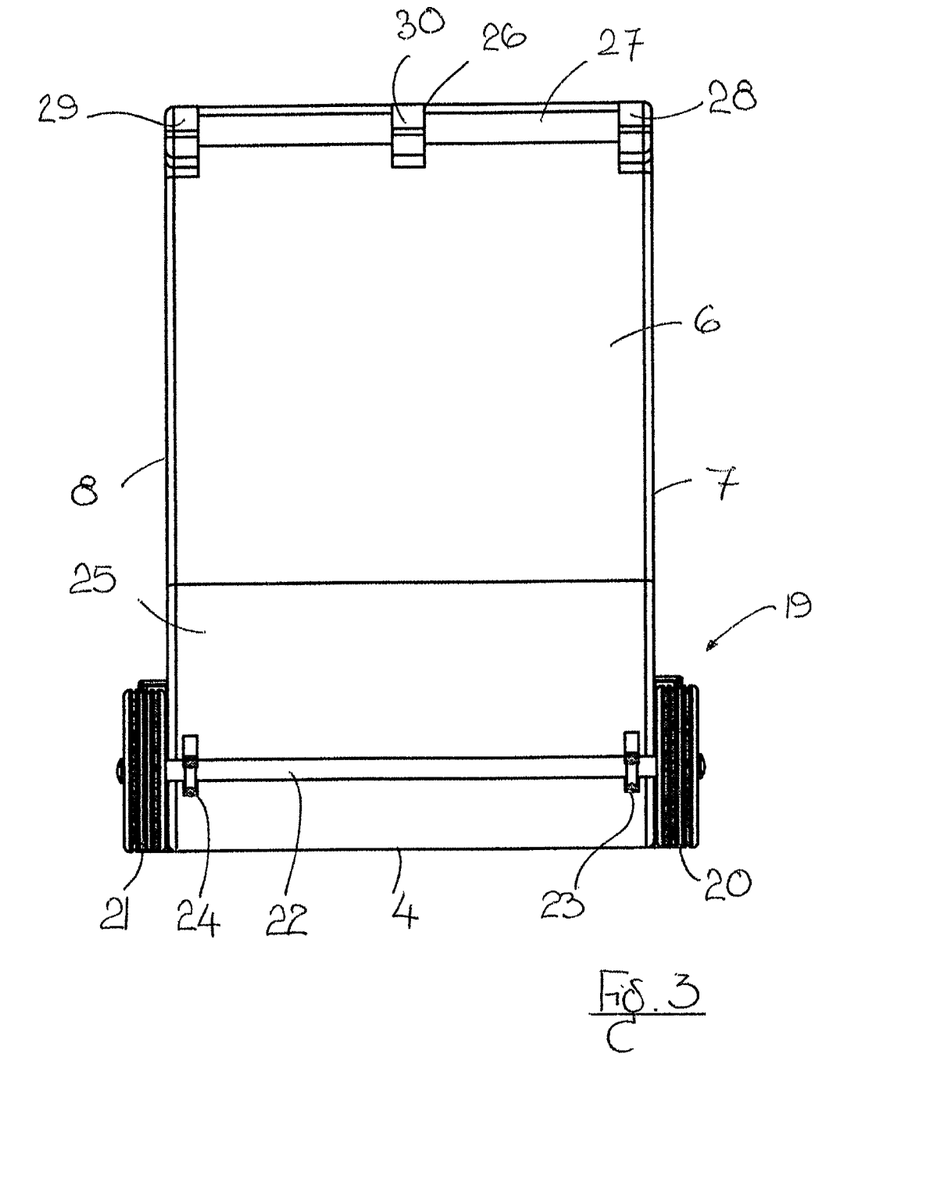
FIG. 3 is a rear elevation of the animal feeder of FIG. 1.

The hopper opening 9 is fitted with a hinged lid 11 for opening and closing the hopper opening 9 and filling the hopper 2 with feed. The hinged lid 11 is shaped to sit in the hopper opening 9 and has a lid front edge 12, a lid rear edge 13, a lid first side edge 14 and a lid second side edge 15.

The front wall 5 is shaped to define a convexly or outwardly curved face 16 adjacent the lid front edge 12 to which the hinged lid 11 conforms in shape to present a non-sharp surface overhanging the trough 3.

The hinged lid 11 is further provided with a centrally located recessed grip 17 on its front edge 12 for raising and lowering the hinged lid 11 and a hinge 18 mounted between the rear edge 13 and the hopper rear wall 6 for moving the hinged lid 11 between open and closed positions.

The rear wall 6 of the hopper 2 is fitted with a wheelset 19 adjacent the bottom wall 4 for moving the animal feeder 1 between locations as required. The wheelset 19 is made up of a first wheel 20 adjacent the first side wall 7 of the hopper 2 and a second wheel 21 adjacent the second side wall 8 of the hopper 2. The first and second wheels 20, 21 are joined by a transverse axle 22 secured to the rear wall 6 by a first axle mounting 23 and a second axle mounting 24.

As shown particularly in FIGS. 4 and 5, the wheelset 19 is mounted on the rear wall 6 adjacent the bottom wall 4 at a second convexly or outwardly curved face 25 of the rear wall 6, disposed diagonally opposite to the convexly or outwardly curved face 16 adjacent the lid front edge 12. The curvature of the convexly or outwardly curved face 25, in combination with the rhomboid-like arrangement of the forwardly disposed front wall 5 and rear wall 6, combine to define a smooth channel through the animal feeder 1 to ensure an enhanced and constant downward flow or passage of feed through the hopper 1 from the opening 11 to the trough 3. More particularly, the curvilinear nature of the rear wall 6 facilitates unhindered flow of feed under gravity through the feeder 1 from the hopper 2 to the trough 3.

The rear wall 6 of the hopper 2 is provided with a handle 26 adjacent the hinge 18 for swivelling the animal feeder 1 on the wheelset 19 and lifting the bottom wall 4 of the hopper 2 from the ground and wheel the animal feeder on the first and second wheels 20,21. The handle 26 is formed from an elongate grip 27 mounted between a first annular mounting 28 adjacent the first side wall 7, a second annular mounting 29 adjacent the second side wall 8 and a central annular mounting 30 disposed between the first and second annular mountings 28,29.

As described above, the recessed trough 3 is located at the front wall 5 of the hopper 2 in a forward position from the bottom wall 4 at ground level to anatomically replicate a truly natural grazing position so that a horse can feed in a biomechanically comfortable and correct posture whilst at the same time allowing continuous grazing-like feeding in a controlled manner. The trough 3 is described in detail in FIGS. 6 to 12.

Figure 6:
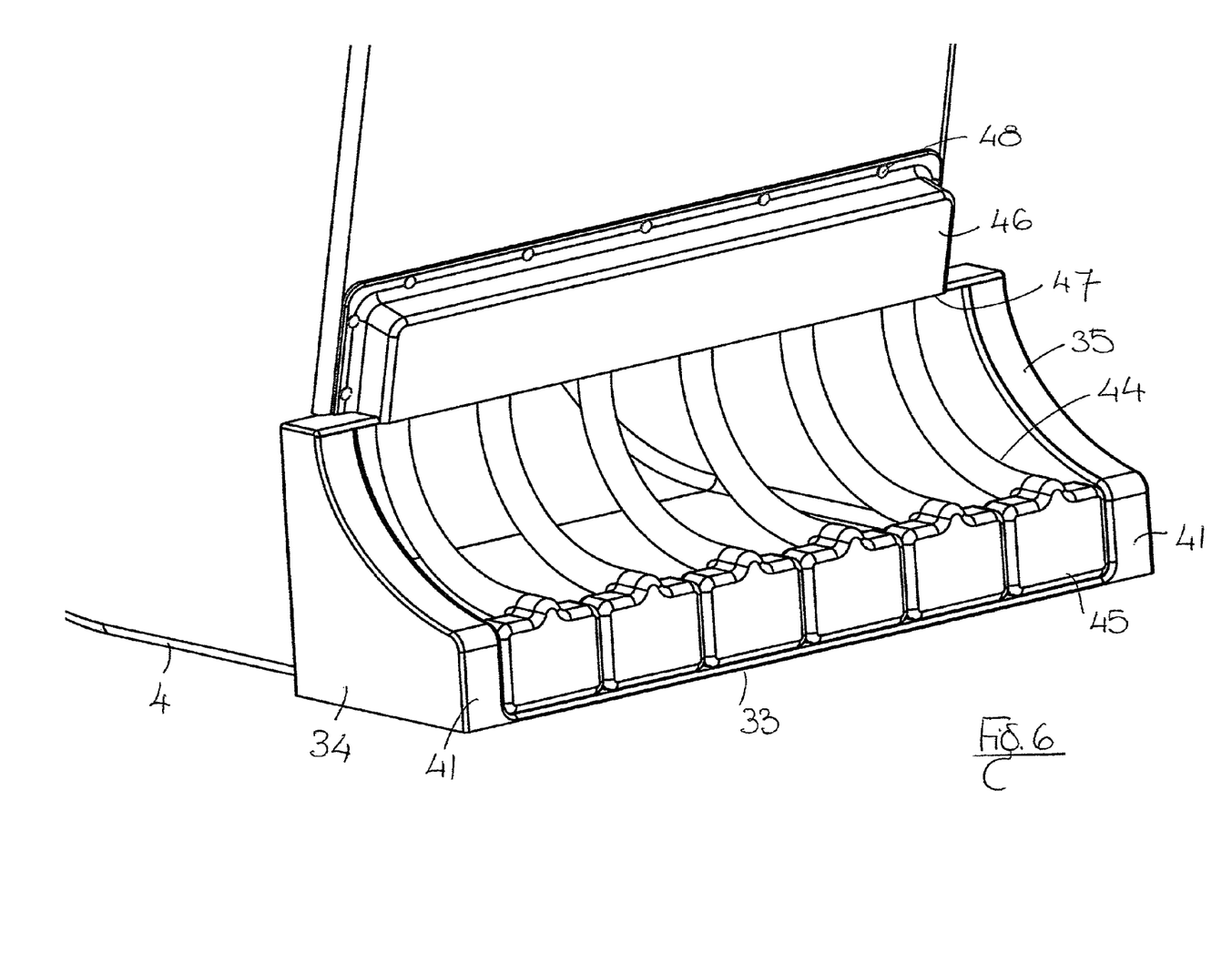
FIG. 6 is an enlarged perspective view from above and the front side of the trough of the animal feeder of FIG. 1 showing the recessed forage/feed outlet and the rate controlled forage/feed dispenser of the trough.
Figure 7:
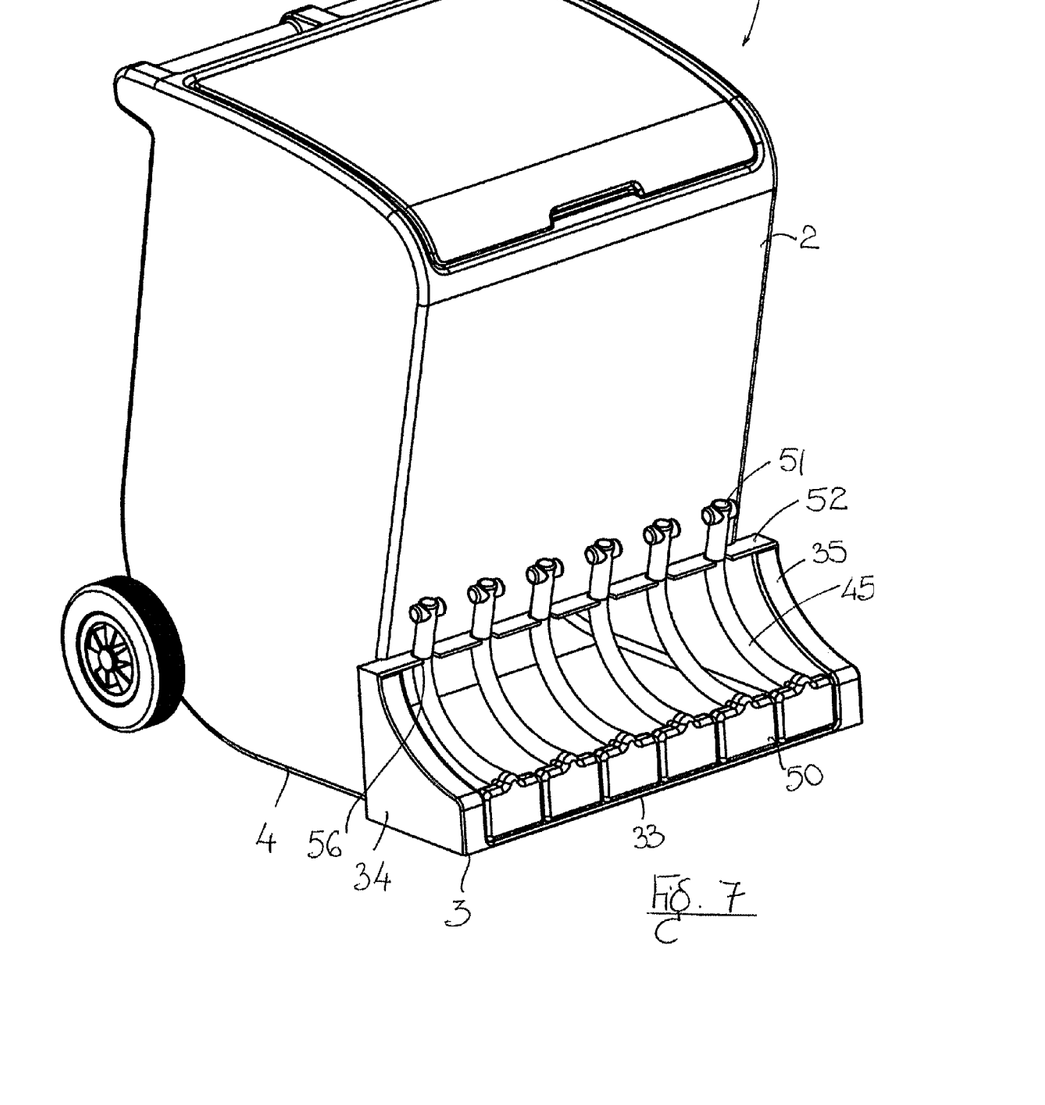
FIG. 7 is a perspective view from above and the front side of the animal feeder with the finger housing removed to show the fingers retained in individual notches formed in a finger retainer extending between the first and second end walls of the trough.

An elongate feed aperture 32 is defined between the front wall 5 and the bottom wall 4 of the hopper to facilitate passage of feed from the hopper 2 to the trough 3 while the trough 3 is formed from a trough bottom wall 33 which extends contiguously forwards and outwards from the bottom wall 4 of the hopper 2, a first substantially triangular end wall 34 parallel with but extending laterally outwards from the first side wall 7 of the hopper 2 and a second substantially triangular end wall 35 parallel with but extending laterally outwards from the second side wall 8 of the hopper 2. An upwardly disposed elongate trough opening 36 is defined between the first and second end walls 34,35 through which an animal can access feed as shall be described more fully below.

Each substantially triangular end wall 34,35 is made up of a bottom edge 37, a rear edge 38 disposed towards the front wall 5 of the hopper 2 and a front edge 39 made up of a convexly or inwardly curved and arcuately recessed portion 40 extending between the rear edge 38 and an upwards or vertically disposed front edge portion 41.

The first and second end walls 34,35 are shaped to define an upwardly disposed arcuately recessed feed outlet 42 therebetween contiguous with the trough opening 36. The feed outlet 42 is fitted with an adjustable feed controlling dispenser 43 for controlling the rate at which an animal can feed from the trough 3 i.e. to prevent an animal from bolting feed and to mimic natural grazing so that the feeder 1 provides a constant but controlled supply of feed to an animal.

Figure 8:
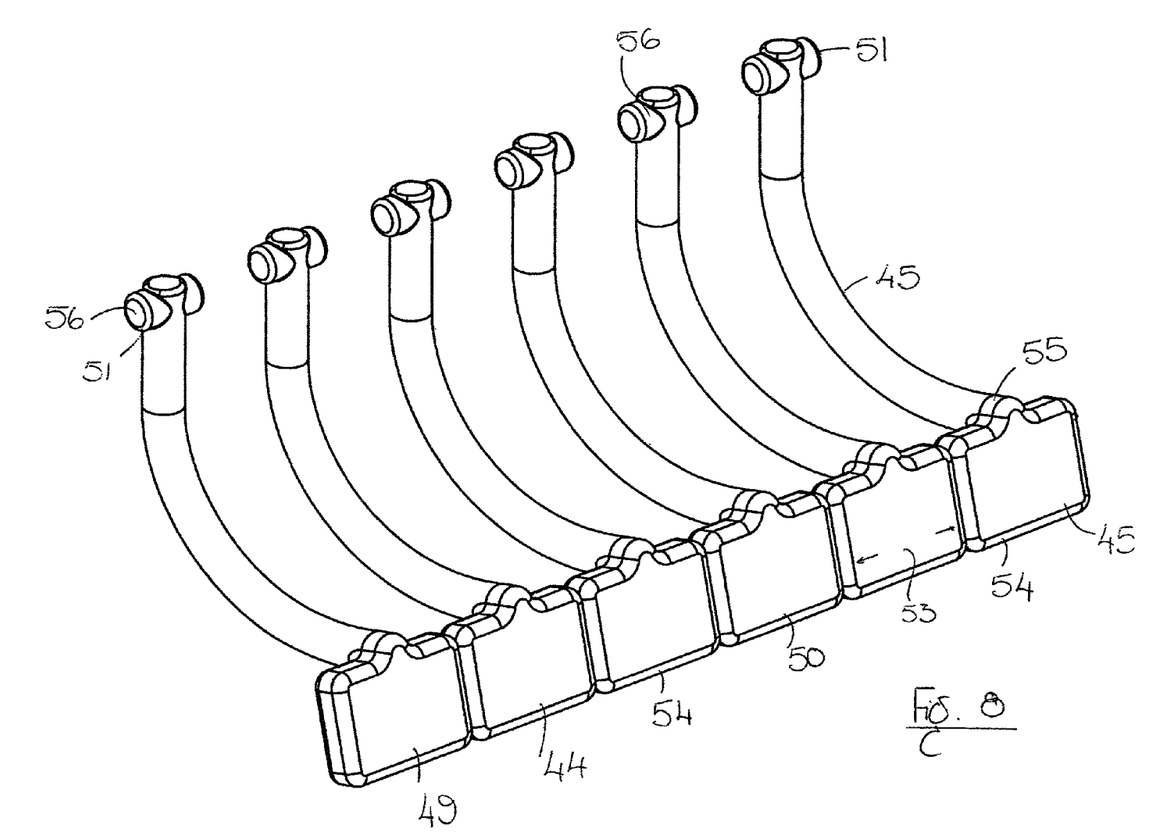
FIG. 8 is an enlarged perspective view from above and the front side of the feeding fingers in the rate controlled forage/feed dispenser of the trough with the finger housing, trough end walls and trough bottom wall removed for clarity.
Figure 12:
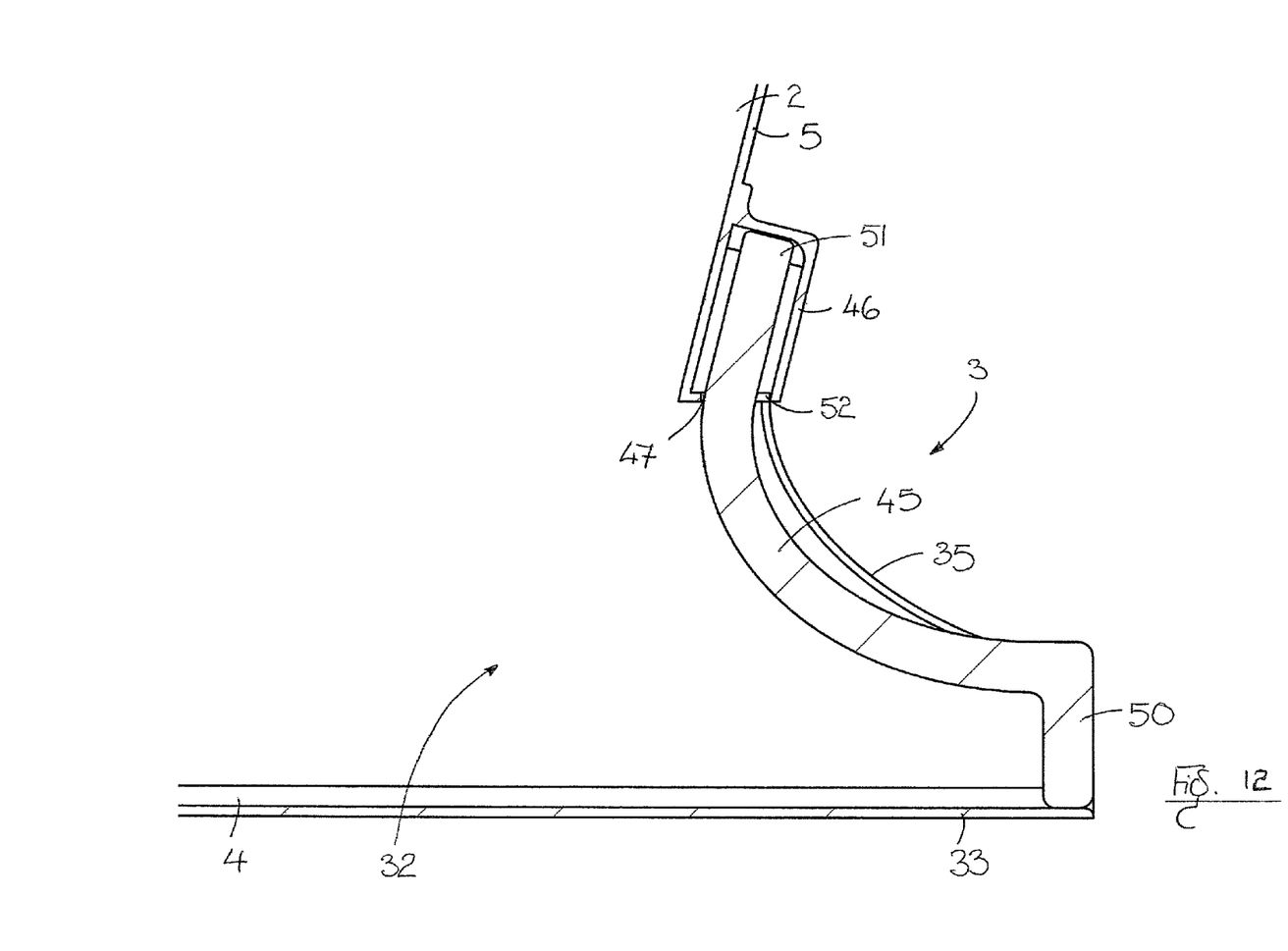
FIG. 12 is an enlarged cross-sectional view through the trough and a finger movably held in the finger housing slot.

The feed controlling dispenser 43 is made up of a series 44 of resilient and flexible arcuate fingers 45 disposed and spaced apart across the feed outlet 42. More particularly, the fingers 45 are arcuately shaped in a concave manner to correspond with the inwardly curved and arcuately recessed portion 40 of the end walls 34,35 and extend between the trough bottom wall 33 and a finger housing 46 mounted on the front wall 5 of the hopper 2 above the feed aperture 32 having an elongate annular finger slot 47 for receiving the fingers 45. The annular finger slot 47 is shaped and sized to hold the fingers 45 in the slot 47 whilst allowing wriggle room or vibration and upwards/downwards movement of the fingers in the annular slot 47 as explained more fully below. The finger housing 46 is secured to the front wall 5 by fasteners 48.

Each finger 45 has a base 49 in the form of a compressible and resilient block-like wedge 50 at its lower end, which extends laterally outwards from the finger 45, and a T-shaped connector 51 at its opposite end. As indicated above, the T-shaped connector 51 of each finger 45 is free to vibrate and move upwards and downwards within the slot 47 of the finger housing 46 should a horse contact or impact the fingers 45 during feeding. However, the fingers are retained within the housing 46 and prevented from detaching from the housing 46 by a finger retainer 52 which extends between the trough first end wall 34 and the trough second end wall 35 to define a top edge of the trough first and second end walls 34,35. The finger retainer 52 is provided with spaced apart circular notches 56 dimensioned, firstly, to receive the fingers 45 and allow slidable upwards and downwards movement of the fingers 45 within the circular notches 56 and, secondly, to prevent the T-shaped connectors 51 from passing through the circular notches 56 and retracting from or exiting the finger housing 46.

The wedges 50 are height-dimensioned to correspond in height with the upright portion 41 of the end walls 34,35 and width-dimensioned, as indicated by the reference numeral 53, so that the series 44 of fingers 45 is held in place in the feed outlet 42 by a compressive force exerted between the end walls 34,35 and the wedges 50—i.e. the wedges 50 are squeezed between the end walls 34,35 while the fingers 45 are spaced apart to allow access to feed in the trough 3. The block-like wedges 50 are provided with contoured side edges 54 to further enhance a tight fit between the end walls 34,35 and reinforcing finger lugs 55 from which the fingers 45 proper extend upwards towards the finger housing 46.

As the fingers 45 are formed from a resilient or rubber-like material and can move within the finger housing 46, the fingers 45 can move upwards and downwards as an animal feeds at the trough 3 e.g. should an animal press downwards on the fingers 45 during feeding, the fingers 45 can slide downwards in the circular notches 56 in the housing 46 while the resilient nature of the fingers 45 and their wedges 50 ensure that the fingers 45 recoil or return to their resting position following feeding and the animal is unharmed.

The fingers 45 can be dimensioned and/or increased or reduced in number as required to control the degree of access to feed through the feed outlet 42 i.e. the feed controlling dispenser 43 can be adjusted according to the feeding pattern of an animal e.g. where a horse is likely to bolt its feed, the number of fingers 45 can be increased so that access to feed is reduced to slow down the eating rate of the animal.

In addition, the wedges 50 define a failsafe release mechanism whereby the compressed wedges 50 are released under pressure from the feed controlling dispenser 43 e.g. should a horse step on the trough 3, the horse's limb will not become trapped in the trough 3 or the feed controlling dispenser 43 as the weight of the horse will cause the wedges 50 to separate and release the fingers 45 so that the horse can safely remove its leg from the feeder 1. However, the feeder 1 remains in-situ and undamaged.

Figure 9:
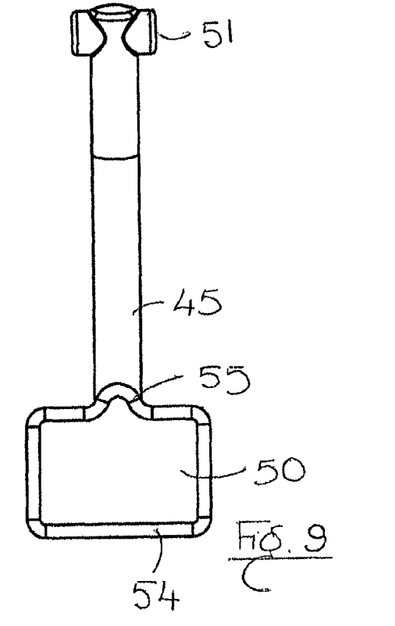
FIG. 9 is an enlarged front elevation of a feeding finger.
Figure 10:
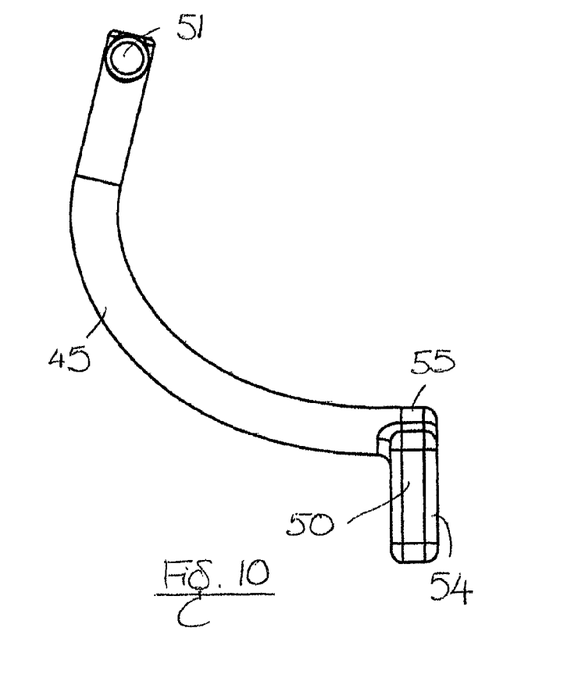
FIG. 10 is a side elevation of the feeding finger of FIG. 9.
Figure 11:
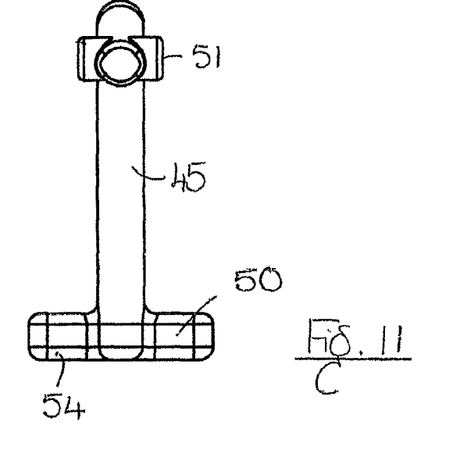
FIG. 11 is a top elevation of the feeding finger of FIG. 9.

In an alternative embodiment of the invention, the T-shaped connector 51 can be replaced by a transverse annular opening for receiving a transverse rod to support the fingers 45 in series in the finger housing slot 47.

In this embodiment, the transverse annular opening for receiving the transverse rod is defined by a laterally extending transverse bore in each finger 45 through which the transverse rod can be inserted to assemble the series 44 of fingers 45. The transverse rod is in turn mounted on the front wall 5 of the hopper 2 at the trough 3.

As shown particularly in FIG. 4, in use, a horse 57 can feed from the animal feeder 1 of the invention as if grazing/foraging in an anatomically natural manner which replicates the horse's natural grazing/foraging position. Moreover, as the hopper 2 is dimensioned to store the horse's daily feed requirement and fitted with a feed controlling dispenser 43, the feeder 1 is adapted to physiologically replicate the natural grazing/foraging pattern thereby ensuring the physical and psychological wellbeing of the horse.

In an alternative embodiment of the invention, the feed controlling dispenser 43 can be replaced by a suitable mesh through which the horse 57 can feed. As with the fingers 45, the mesh can be formed from a resilient, flexible material. Various interchangeable meshes of differing sizes can be employed according to an animal's needs, eating habits or dietary requirements in analogous manner to varying the fingers 45 of the feed controlling dispenser 43.

In a further embodiment of the invention, the hopper 2 is provided with a feed level indicator means such as embossed or debossed formations to indicate the quantity of feed remaining in the hopper 2. The feed level indicator can also be made up of a window in the hopper 2 to render the feed level visible or indeed a mechanical feed level indicator if desired.

If desired, the animal feeder 1 can be fitted with a device for increasing the flow of feed through the hopper 2 to the trough 3. Suitable flow increasing devices include a plate shaped to fit and descend under gravity within the hopper 2 which can simply be placed on the feed adjacent the hopper opening 9. The weight of the plate causes a compressive force to be applied to the feed to urge the feed through the feeder 1. Alternatively, the flow increasing device can be a mechanical flow increasing device if desired.

As will be appreciated by those skilled in the art, the animal feeder 1 can be dimensioned as required during manufacture for various animal sizes and eating habits. The animal feeder 1 can also be used outdoors if required while the shape of the animal feeder 1 can be altered if desired in accordance with the location in which the animal feeder is to be placed. For example, the animal feeder 1 can be shaped to fit into a corner. In this embodiment, the hopper can be conical or triangular in shape whilst maintaining suitable curved smooth faces in the hopper 2 to ensure uninterrupted flow of feed through the hopper 2 to the trough 3.

The feeder 1 of the invention can be formed from any suitable material such as plastics and the like.

The invention is not limited to the embodiments herein described which may be varied in construction and detail without departing from the scope of the invention.

The invention claimed is:

1. An animal feeder comprising:
   a hopper for storing feed,
   a trough, from which an animal can feed, disposed beneath the hopper and communicable with the hopper to receive feed from the hopper, wherein the trough comprises a recessed feed outlet from which an animal can extract feed from the trough and the trough is at ground level to present feed to an animal in an anatomically replicated natural grazing position, and a feed controlling dispenser at the feed outlet, the feed controlling dispenser comprising a series of fingers disposed across the recessed feed outlet for regulating access to the feed in the trough, wherein each finger comprises a releasable failsafe mechanism for individually releasing the fingers from the series of fingers, and wherein the releasable failsafe mechanism comprises a releasable wedge on each finger that can be released under weight pressure.

2. An animal feeder as claimed in claim 1 wherein the trough is recessed beneath the hopper.

3. An animal feeder as claimed in claim 1 wherein the hopper comprises at least one curved wall portion to direct feed from the hopper to the trough.

4. An animal feeder as claimed in claim 3 wherein the hopper comprises a bottom wall, and a front wall, a rear wall, a first side wall and a second side wall upstanding from the bottom wall and the trough is forwardly disposed on the front wall, the rear wall comprising the curved wall portion to direct feed towards the forwardly disposed trough from the hopper.

5. An animal feeder as claimed in claim 4 wherein the rear wall and the front wall are forwardly inclined to direct feed from the hopper towards the curved wall portion.

6. An animal feeder as claimed in claim 1 wherein the hopper is communicable with the trough via a feed aperture defined between the hopper and the trough.

7. An animal feeder as claimed in claim 1 further comprising a hopper lid.

8. An animal feeder as claimed in claim 1 further comprising a wheelset mounted on the feeder for moving the feeder.

9. An animal feeder as claimed in claim 1 further comprising a handle on the hopper.

10. An animal feed dispenser as claimed in claim 1 wherein the releasable failsafe mechanism is adapted to prevent entrapment of a limb in the trough.

11. An animal feeder as claimed in claim 1 wherein the fingers are arcuately curved in a concave recessed disposition into the trough.

12. An animal feeder as claimed in claim 1 wherein the fingers are movably mounted in the series of fingers to allow upwards and downwards movement of the fingers during feeding.

13. An animal feeder as claimed in claim 12 wherein the fingers are slidably mounted in a housing adjacent the recessed feed outlet, the housing being fitted with a retainer to prevent retraction of the fingers from the retainer.

14. An animal feeder as claimed in claim 1 wherein the releasable failsafe mechanism further comprises a rod on the feeder from which the fingers are mounted between the rod and the releasable wedges across the recessed feed outlet so that the fingers remain on the rod following release.

15. An animal feeder as claimed in claim 1 further comprising means for regulating access to the feed comprising a mesh.

16. An animal feeder as claimed in claim 1 wherein the feeder is a horse feeder.

\* \* \* \* \*